United States Patent
Durdanovic et al.

(10) Patent No.: US 10,740,676 B2
(45) Date of Patent: Aug. 11, 2020

(54) PASSIVE PRUNING OF FILTERS IN A CONVOLUTIONAL NEURAL NETWORK

(71) Applicant: NEC Laboratories America, Inc., Princeton, NJ (US)

(72) Inventors: Igor Durdanovic, Lawrenceville, NJ (US); Hans Peter Graf, Lincroft, NJ (US)

(73) Assignee: NEC Corporation (JP)

( * ) Notice: Subject to any disclaimer, the term of this patent is extended or adjusted under 35 U.S.C. 154(b) by 741 days.

(21) Appl. No.: 15/595,049

(22) Filed: May 15, 2017

(65) Prior Publication Data

US 2017/0337472 A1 Nov. 23, 2017

Related U.S. Application Data

(60) Provisional application No. 62/338,573, filed on May 19, 2016, provisional application No. 62/338,797, filed on May 19, 2016.

(51) Int. Cl.
 *G06N 3/08* (2006.01)
 *G06N 3/04* (2006.01)
(52) U.S. Cl.
 CPC ........... *G06N 3/082* (2013.01); *G06N 3/0454* (2013.01)
(58) Field of Classification Search
 CPC ..................................................... G06N 3/082
 See application file for complete search history.

(56) References Cited

PUBLICATIONS

Anwar, Sajid et al.; Compact Deep Convolutional Neural Networks With Coarse Pruning; Seoul National University; 2016; pp. 1-10. (Year: 2016).*
Han, Song et al.; Deep Compression: Compressing Deep Neural Networks With Pruning, Trained Quantization and Huffman Coding; 2016; ICLR 2026; pp. 1-14. (Year: 2016).*
Li, Hao et al.; Pruning Filters for Efficient ConvNets; In Proceedings of NIPS Workshop on Efficient Methods for Deep Neural Networks, Barcelona, Spain, Dec. 2016; pp. 1-5. (Year: 2016).*
Anwar, Sajid et al.; Structured Pruning of Deep Convolutional Neural Networks; Seoul National University; 2017; pp. 32:1-32:18. (Year: 2017).*
Song Han, Learning both Weights and Connections for Efficient Neural Networks, Computer Science, Neural and Evolutionary Computing, Oct. 2015.
Adam Polyak, Channel-Level Acceleration of Deep Face Representations, Special Section on Applying Four Ds of Machine Learning to Advance Biometrics, Oct. 2015.
Hao Li, Pruning Filters for Efficient Convnets, Computer Science, Computer Vision and Pattern Recognition, Mar. 2017.

* cited by examiner

*Primary Examiner* — Stanley K. Hill
(74) *Attorney, Agent, or Firm* — Joseph Kolodka

(57) ABSTRACT

Methods and systems of training a neural network includes training a neural network based on training data. Weights of a layer of the neural network are multiplied by an attrition factor. A block of weights is pruned from the layer if the block of weights in the layer has a contribution to an output of the layer that is below a threshold.

19 Claims, 3 Drawing Sheets

PASSIVE PRUNING OF FILTERS IN A CONVOLUTIONAL NEURAL NETWORK

RELATED APPLICATION INFORMATION

This application claims priority to U.S. Patent Application No. 62/338,573, filed on May 19, 2016, and 62/338,797, filed on May 19, 2016, incorporated herein by reference in their entirety.

BACKGROUND

Technical Field

The present invention relates to neural networks and, more particularly, to filter pruning in convolutional neural networks.

Description of the Related Art

As convolutional neural networks (CNNs) grow deeper (i.e., involve progressively more layers), the cost of computing inferences increases with the number of parameters and convolution operations involved. These computational costs are particularly relevant when dealing with embedded sensors and mobile devices where computational and power resources are limited. High inference costs post a similar barrier in contexts where high responsiveness and low latency are needed.

Existing approaches to reducing the storage and computation costs involve model compression by pruning weights with small magnitudes and then retraining the model. However, pruning parameters does not necessarily reduce computation time, because the majority of the parameters that are removed are from fully connected layers where the computation cost is low. In addition, the resulting sparse models lack optimizations that make computations practical.

SUMMARY

A method of training a neural network includes training a neural network based on training data. Weights of a layer of the neural network are multiplied by an attrition factor. A block of weights is pruned from the layer if the block of weights in the layer has a contribution to an output of the layer that is below a threshold.

A method of training a neural network includes training a convolutional neural network based on training data. Weights of a layer of the neural network are multiplied by a number less than one. A block of weights in the layer is pruned, a filter corresponding to the block of weights in a subsequent layer in the neural network is pruned, and a block of weights that corresponds to the pruned filter in a subsequent layer in the neural network is pruned if the block of weights in the layer has a contribution to an output of the layer that is below a threshold. The contribution of a block of weights to the output of the layer is calculated as a percentage of a sum of absolute weights of the weights in the layer made up by a sum of absolute weights of the weights in the block of weights.

A system for training a neural network includes a neural network. A training module is configured to train the neural network based on training data. A pruning module is configured to multiply weights of a layer of the neural network by an attrition factor and to prune a block of weights from the layer if the block of weights in the layer has a contribution to an output of the layer that is below a threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for active pruning of filters in convolutional neural networks (CNNs). During training, the present embodiments reduce the size of all weights between each iteration, driving the weight values toward zero. Once a set of weights falls below a threshold, the weights are removed from the CNN along with associated kernels, thereby reducing the computational cost of using the pruned CNN without increasing the sparsity of the CNN. Because sparsity does not increase, the present embodiments do not necessitate the use of sparse libraries or specialized hardware. The number of filters that are pruned correlates directly with computational acceleration by reducing the number of matrix multiplications.

CNNs are extensively used in image and video recognition, natural language processing, and other machine learning processes. CNNs use multi-dimensional layers of weights to create filters that have small spatial coverage but that extend through the full depth of an input volume. To use the example of an image input, the individual pixels represent the width and height of the input, while the number of colors (e.g., red, green, and blue) represent the depth. Thus, a filter in a CNN being used to process image data would apply to a limited number of pixels but would apply to all of the color information for those pixels. The filter is convolved across the width and height of the input volume, with dot products being calculated between entries of the filter and the input at each position.

The present embodiments actively drive weights to zero during training and prune convolutional filters associated with low-magnitude weights. Thus, convolutional filters that are not maintained during training are driven down to zero. This results in an efficient network that involves fewer convolutional operations.

Figure 1:
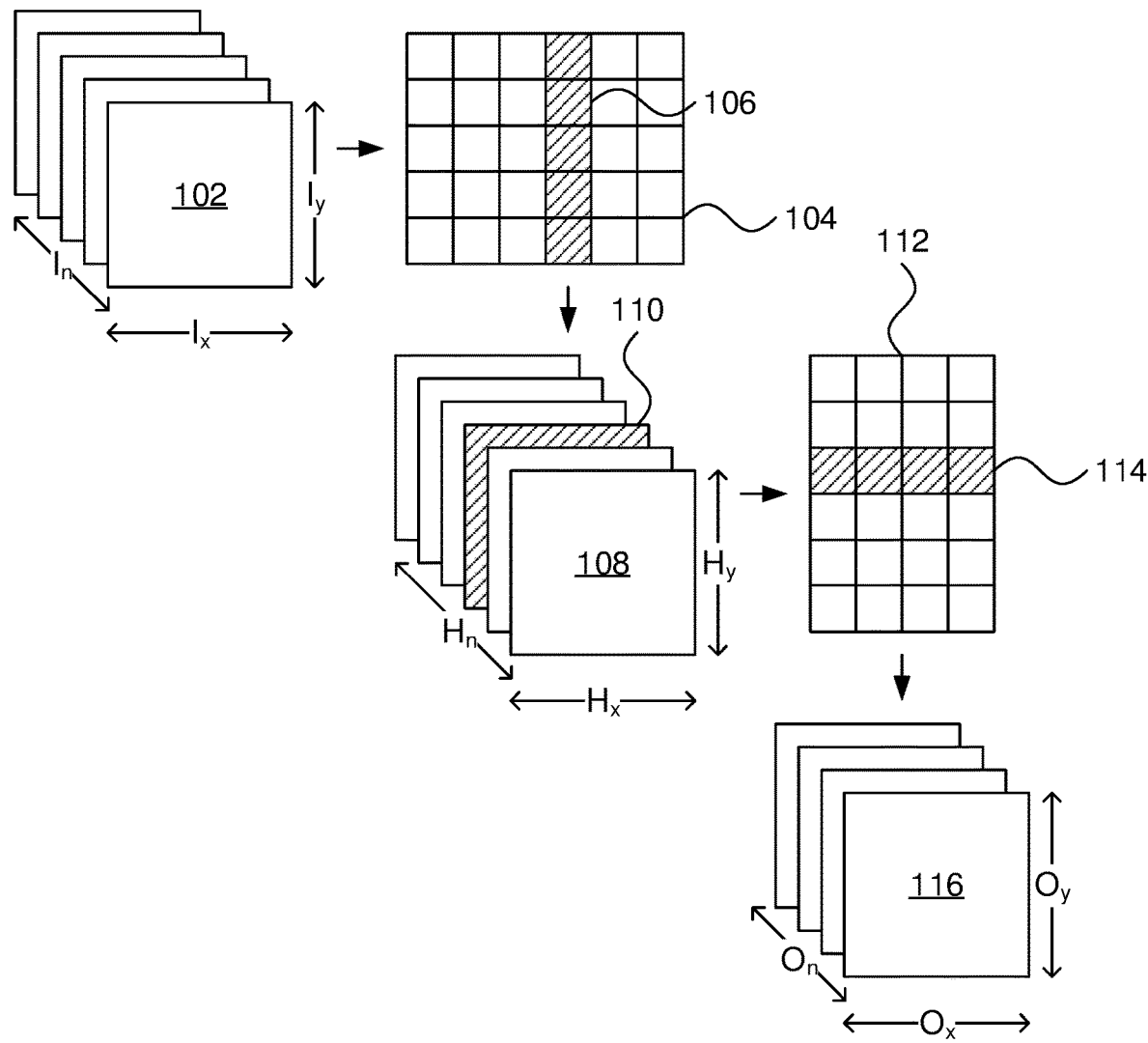
FIG. 1 is a diagram illustrating the pruning of a block of weights and corresponding filter from a convolutional neural network in accordance with an embodiment of the present invention.

Referring now in detail to the figures in which like numerals represent the same or similar elements and initially to FIG. 1, a diagram of active pruning of a CNN is shown. An input layer 102 is provided with neurons that perform a processing function on an input volume 102 that may represent, for example, an image, a frame of video, a document, or any other appropriate set of multi-dimensional input data. The input layer 102 in this example includes three dimensions (e.g., x, y, and n). The neurons can be grouped into n filters, each filter having a dimensions x and y. The outputs of the input layer 102 are provided to a first array of weights 104.

During training, the values of the weights 104 are multiplied by an attrition factor a that is less than 1 (e.g., a=0.9999). Thus, during each iteration of training, those weights which are not enhanced by the training process will eventually decrease in magnitude until they fall below a threshold. In this example, a column 106 has fallen below the threshold, representing weights which do not contribute to the accuracy of the output. This column 106 is pruned from the first array of weights 104.

The first array of weights 104 provides its output to a layer of hidden neurons 108. The pruned column 106 corresponds to one filter 110 that is pruned from the layer of hidden neurons 108. The layer of hidden neurons 108 perform a computational function and provide an output to a second array of weights 112.

The pruned filter 108 in turn corresponds to a row 114 of the second array of weights 112, which is also pruned. The second array of weights provides its output to a layer of output neurons 116 (or, alternatively, additional hidden layers) which performs a computational function and provides the output of the CNN. The active pruning of weights significantly reduces the number of computations needed to produce the output.

Figure 2:
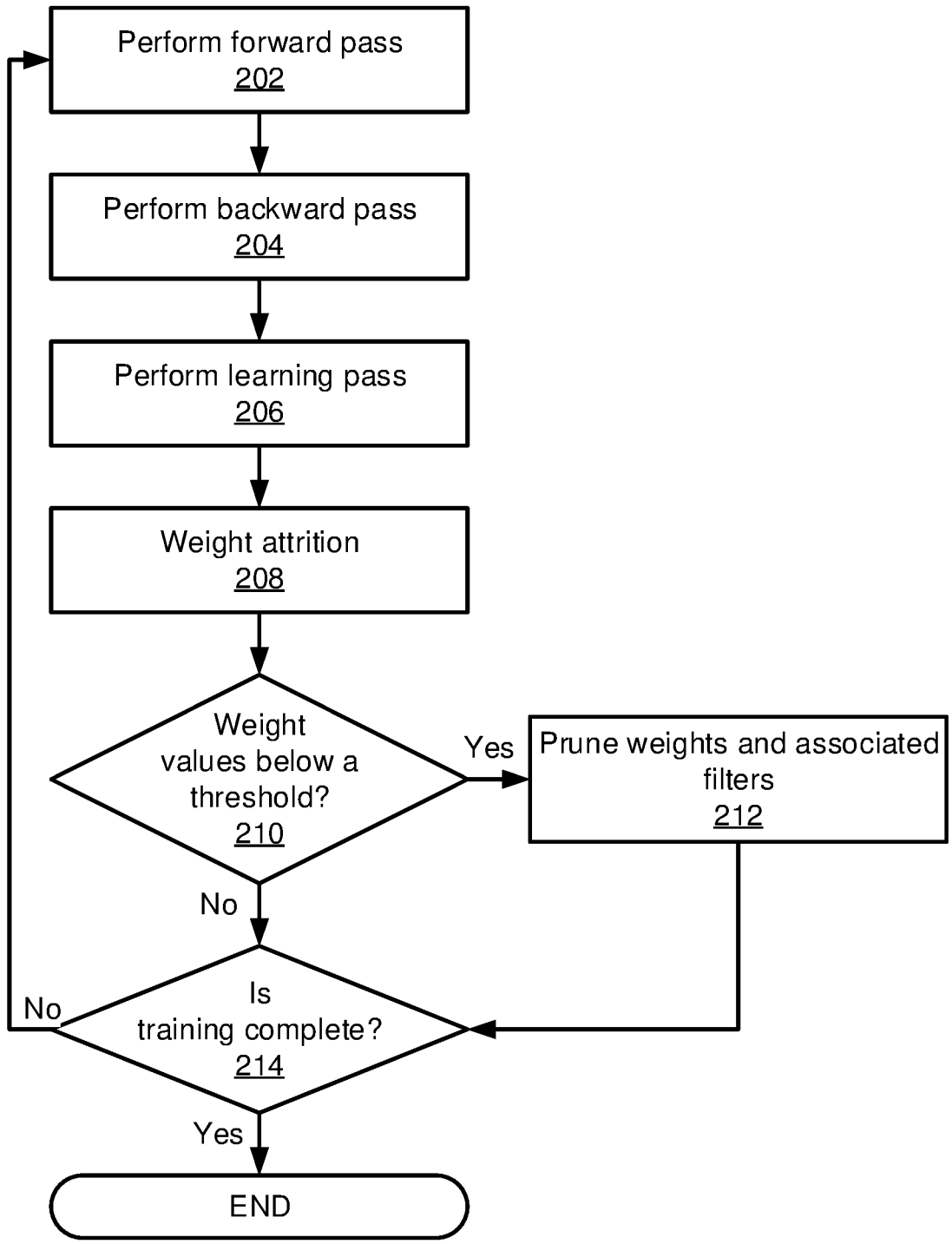
FIG. 2 is a block/flow diagram of a method for pruning weights and filters from a convolutional neural network in accordance with an embodiment of the present invention.

Referring now to FIG. 2, a method for training a CNN is shown. The present embodiments perform training by performing a forward pass 202 through a CNN to provide a calculation. This forward pass can be expressed as, e.g., K=I×W, where W represents an array of weights, data input to the array of weights, and K represents the output of the array of weights. Block 204 then performs a backward pass, B=G×W, where G is a gradient input to the array of weights W, providing the back-propagated gradient B. Block 206 performs a learning pass ΔW=I×G, which adjusts the weights in the weight array by ΔW.

After performing the learning pass, the weights are driven toward zero in block 208 by multiplying the weights by an attrition factor a that is less than zero (e.g., a=0.9999). Block 210 determines whether any block of weight values have dropped below a threshold contribution to the output (e.g., 10%). The contribution to the output of a block of weights (e.g., a column or row of weights) may be determined as a sum of absolute weight values. The sum of absolute weight values for each block of weights can then be compared to the total sum of absolute weight values to determine the contribution of that block of weights.

If the block of weight values have dropped below the threshold level of contribution toward the output, block 212 prunes those weights, and any associated filters and weights on other layers. Block 214 then determines whether training is complete (e.g., whether the output of the trained CNN matches an expected output). If so, training completes. If not, processing returns to block 202.

For simpler CNNs, any of the filters in any convolutional layer can be easily pruned. However, for complex network architectures, pruning may not be straightforward. Complex architectures may impose restrictions, such that filters need to be pruned carefully. In one example, correspondences between filters may necessitate the pruning of filters to permit pruning of a given convolutional layer.

The above-described method is applied on a per-layer basis until the entire CNN is trained. At each layer, pruning may be repeated until the validation error raises beyond some threshold. When training neural networks, the validation set is a set of data that have not been used in training, but instead are processed by the network in forward passes to determine how accurately the network classifies data it has not seen during training. During training, the error rate on the validation set generally decreases. Once the error rate stops decreasing, the neural net is generally considered to be trained. Thus, pruning as part of the training process stops at this point as well.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
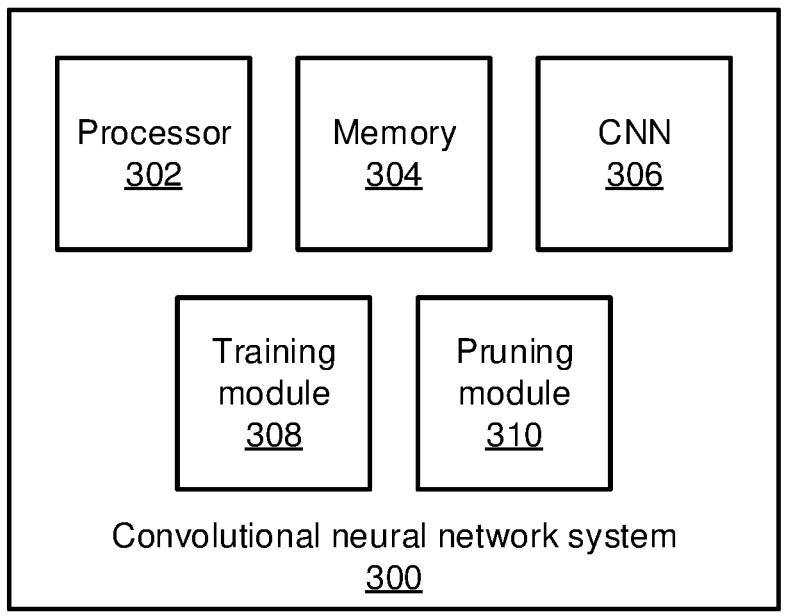
FIG. 3 is a block diagram of a convolutional neural network system that prunes the convolutional neural network in accordance with an embodiment of the present invention.

Referring now to FIG. 3, a CNN system 300 is shown. The system 300 includes a hardware processor 302 and memory 304. A CNN 306 is implemented either in hardware or in software. The CNN 306 takes input data and generates an output based on the filters and weights that make up the CNN's configuration. The system 300 furthermore includes one or more functional modules that may, in some embodiments, be implemented as software that is stored in the memory 304 and executed by hardware processor 302. In alternative embodiments, the functional modules may be implemented as one or more discrete hardware components in the form of, e.g., application specific integrated chips or field programmable gate arrays.

In particular, a training module 308 trains the CNN 306 based on training data. The training data includes one set of data used to train the CNN 306 and another set of data used to test the CNN 306, with differences between the outcome of the 306 and expected outcome from the testing data being used to adjust the CNN 306. A pruning module 310 actively moves the weights of the CNN toward zero in each round of training and prunes filters from the CNN 306 to reduce the computational complexity. The training module 308 and the pruning module 310 work together as described above to ensure that the output of the CNN 306 is not significantly degraded by pruning.

Figure 4:
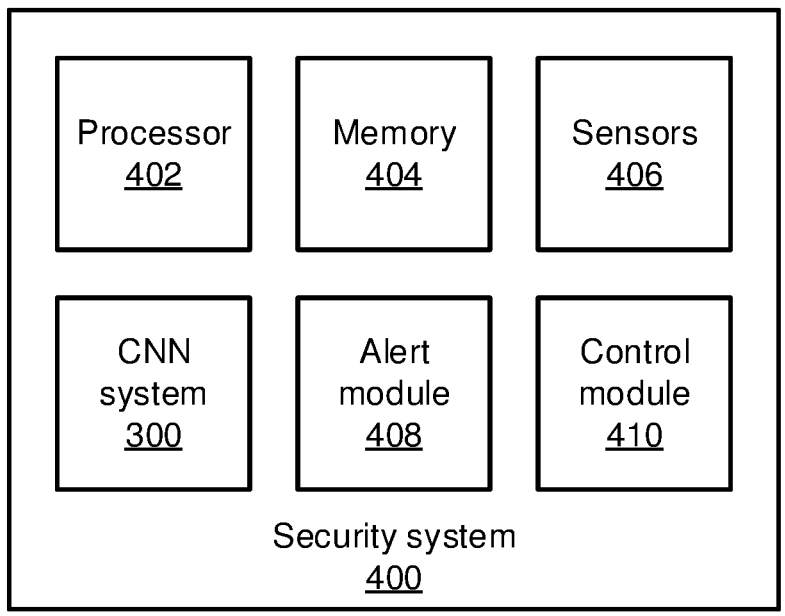
FIG. 4 is a block diagram of a security system based on pruned convolutional neural network classifiers in accordance with an embodiment of the present invention.

Referring now to FIG. 4, a security system 400 is shown as one possible implementation of the present embodiments. The security system 400 includes a hardware processor 402 and a memory 404. One or more sensors 406 provide data about a monitored area to the security system 400. The sensors 406 may include, for example, a camera, a night vision camera (e.g., operating in infrared), door and window sensors, acoustic sensors, temperature sensors, and any other sensors that collect raw data regarding the monitored area.

The CNN system 300 is included in the security system 400. The CNN system 300 accepts information that is gathered by the sensors 406 and stored in memory 404, outputting security status information. The CNN system 300 may include its own separate processor 302 and memory 304 or may, alternatively, omit those feature in favor of using the processor 402 and memory 404 of the security system 400.

An alert module 408 accepts the output of the CNN system 300. The alert module 408 determines if the state of the area being monitored has changed and, if so, whether an alert should be issued. For example, the CNN system 300 may detect movement or the presence of a person or object in a place where it does not belong. Alternatively, the CNN system 300 may detect an intrusion event. In such a situation, the alert module 408 provides an appropriate alert to one or more of the user and a response organization (e.g., medical, police, or fire). The alert module 408 provide the alert by any appropriate communications mechanism, including by wired or wireless network connections or by a user interface.

A control module 410 works with the alert module 408 to perform appropriate security management actions. For example, if an unauthorized person is detected by the CNN system 300, the control module 410 may automatically increase a security level and perform such actions as locking doors, increasing sensor sensitivity, and changing the sensitivity of the alert module 408.

Because the CNN system 300 has been pruned, the CNN system 300 can provide accurate results with relatively low computational complexity, making it possible to implement the security system 400 on lower-power hardware. In particular, the processor 402 need not be a high-powered device and may in particular be implemented in an embedded environment.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of training a neural network, comprising:
training a neural network based on training data;
multiplying weights of a layer of the neural network by an attrition factor; and
pruning a block of weights from the layer if the block of weights in the layer has a contribution to an output of the layer that is below a threshold.

2. The method of claim 1, wherein the attrition factor is a number less than one.

3. The method of claim 1, wherein the contribution of a block of weights to the output of the layer is calculated as a percentage of a sum of absolute weights of the weights in the layer made up by a sum of absolute weights of the weights in the block of weights.

4. The method of claim 1, further comprising pruning a filter in a subsequent layer in the neural network that corresponds to the pruned block of weights.

5. The method of claim 4, further comprising pruning a block of weights in a subsequent layer in the neural network that corresponds to the pruned filter.

6. The method of claim 1, wherein the neural network is a convolutional neural network.

7. The method of claim 1, wherein training, multiplying, and pruning are repeated until output of the neural network is within a threshold difference from an expected output for a validation data set.

8. The method of claim 1, wherein training the neural network comprises a forward pass using the training data, a backward pass, and a learning pass that updates weights of the neural network.

9. The method of claim 1, wherein pruning a block of weights comprises removing a column or row of an array of weights.

10. A method of training a neural network, comprising:
training a convolutional neural network based on training data;
multiplying weights of a layer of the neural network by a number less than one; and
pruning a block of weights from the layer, pruning a filter corresponding to the block of weights in a subsequent layer in the neural network, and pruning a block of weights that corresponds to the pruned filter in a subsequent layer in the neural network, if the block of weights in the layer has a contribution to an output of the layer that is below a threshold, wherein the contribution of a block of weights to the output of the layer is calculated as a percentage of a sum of absolute weights of the weights in the layer made up by a sum of absolute weights of the weights in the block of weights.

11. A system for training a neural network, comprising:
a neural network;

a training module configured to train the neural network based on training data; and a pruning module configured to multiply weights of a layer of the neural network by an attrition factor and to prune a block of weights from the layer if the block of weights in the layer has a contribution to an output of the layer that is below a threshold.

12. The system of claim 11, wherein the attrition factor is a number less than one.

13. The system of claim 11, wherein the pruning module is further configured to calculate the contribution of a block of weights to the output of the layer as a percentage of a sum of absolute weights of the weights in the layer made up by a sum of absolute weights of the weights in the block of weights.

14. The system of claim 11, further wherein the pruning module is further configured to prune a filter in a subsequent layer in the neural network that corresponds to the pruned block of weights.

15. The system of claim 14, wherein the pruning module is further configured to prune a block of weights in a subsequent layer in the neural network that corresponds to the pruned filter.

16. The system of claim 11, wherein the neural network is a convolutional neural network.

17. The system of claim 11, wherein the training module and the pruning module are further configured to repeat training, multiplying, and pruning until output of the neural network is within a threshold difference from an expected output for a validation data set.

18. The system of claim 11, wherein the training module is further configured to train the neural network using a forward pass using the training data, a backward pass, and a learning pass that updates weights of the neural network.

19. The system of claim 11, wherein the pruning module is further configured to remove a column or row of an array of weights.

* * * * *